(12) United States Patent
Mori

(10) Patent No.: US 11,372,206 B2
(45) Date of Patent: Jun. 28, 2022

(54) OPTICAL SYSTEM WITH TWO LENS GROUPS OF +− REFRACTIVE POWERS HAVING FIVE LENS SUBGROUPS OF +−+−− REFRACTIVE POWERS, AND IMAGE PICKUP APPARATUS INCLUDING THE SAME

(71) Applicant: CANON KABUSHIKI KAISHA, Tokyo (JP)

(72) Inventor: Takeo Mori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 16/694,949

(22) Filed: Nov. 25, 2019

(65) Prior Publication Data

US 2020/0174225 A1 Jun. 4, 2020

(30) Foreign Application Priority Data

Dec. 3, 2018 (JP) .............................. JP2018-226782

(51) Int. Cl.
*G02B 9/64* (2006.01)
*G02B 13/02* (2006.01)
*G02B 15/14* (2006.01)

(52) U.S. Cl.
CPC ............... *G02B 9/64* (2013.01); *G02B 13/02* (2013.01); *G02B 15/145105* (2019.08)

(58) Field of Classification Search
CPC . G02B 15/145101–145103; G02B 15/145105; G02B 15/1451; G02B 15/145107; G02B 15/144101; G02B 15/1461; G02B 15/24; G02B 9/64
See application file for complete search history.

(56) References Cited

U.S. PATENT DOCUMENTS

| 4,896,950 A | 1/1990 | Endo |
| 2007/0258150 A1 | 11/2007 | Takato |
| 2012/0127594 A1 | 5/2012 | Yamamoto |
| 2013/0188091 A1 | 7/2013 | Hara |
| 2014/0347545 A1 | 11/2014 | Obikane |
| 2015/0323764 A1 | 11/2015 | Mori |
| 2016/0306148 A1 | 10/2016 | Hara |
| 2017/0322399 A1 | 11/2017 | Sugita |

FOREIGN PATENT DOCUMENTS

| CN | 106873139 A | 6/2017 |
| DE | 102018104684 A1 | 9/2018 |
| JP | 2000121941 A | 4/2000 |
| WO | 2017/134929 A1 | 8/2017 |

*Primary Examiner* — Wen Huang
(74) *Attorney, Agent, or Firm* — Canon U.S.A., Inc. IP Division

(57) ABSTRACT

An optical system includes a front lens group and a rear lens group that are disposed in order from an object side to an image side of the optical system, the front lens group having a positive refractive power and the rear lens group having a negative refractive power. The rear lens group consists of a lens unit Ln1 that is arranged to move towards the image side when focusing and that has a negative refractive power, and a lens unit Ln2 that is disposed closer to the image side than the lens unit Ln1 and that has a negative refractive power. The front lens group includes a lens unit Lpf arranged to move during focusing. The rear lens group satisfies a predetermined conditional expression.

17 Claims, 11 Drawing Sheets

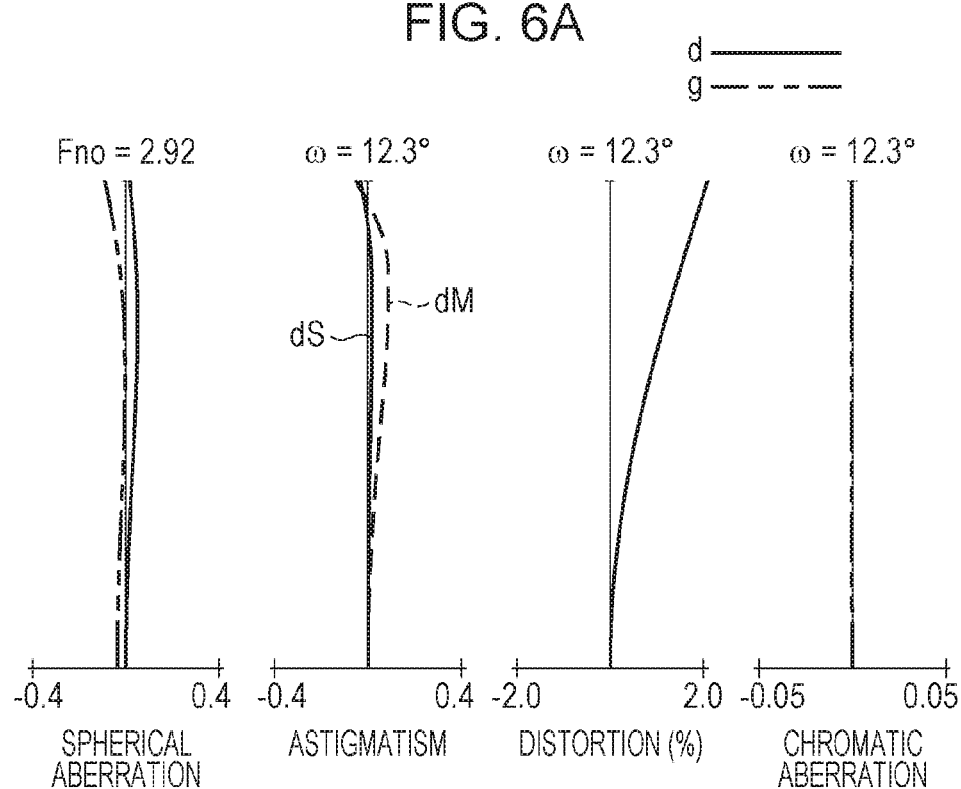
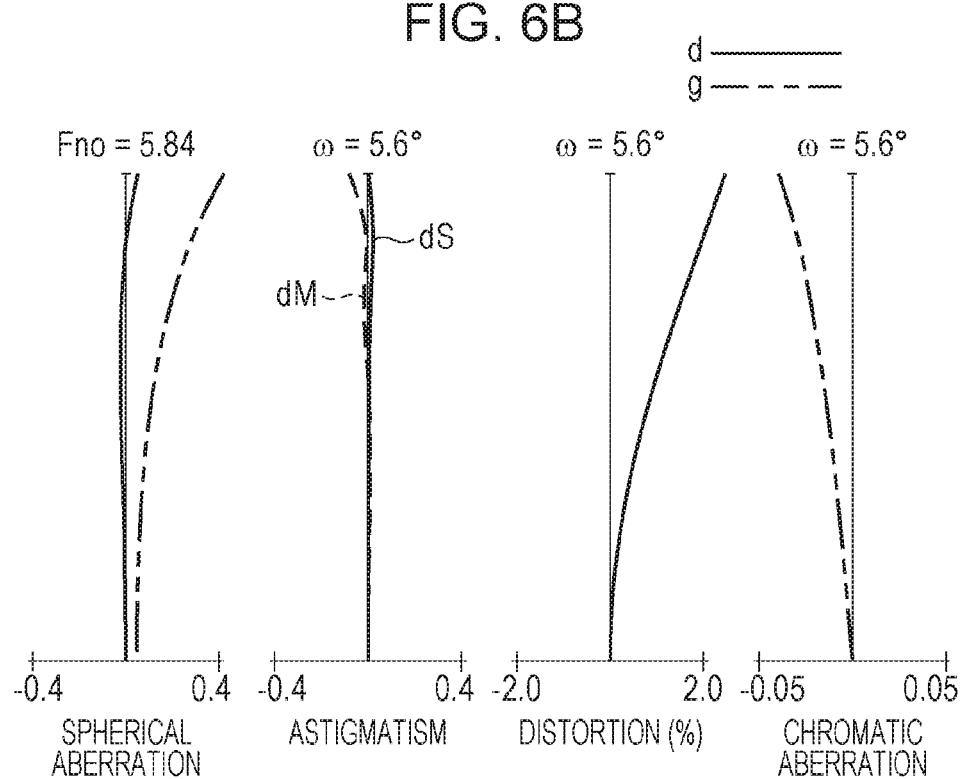

OPTICAL SYSTEM WITH TWO LENS GROUPS OF +− REFRACTIVE POWERS HAVING FIVE LENS SUBGROUPS OF +−+−− REFRACTIVE POWERS, AND IMAGE PICKUP APPARATUS INCLUDING THE SAME

BACKGROUND OF THE INVENTION

Field of the Invention

The present invention relates to an optical system, and is suitable for, for example, a digital video camera, a digital still camera, a broadcast camera, a silver-halide film camera, and a monitoring camera.

Description of the Related Art

In an image pickup optical system, as the photographing distance decreases, the amounts of various aberrations increase. Therefore, in a macro lens (a micro lens) for primarily taking photographs at close distances, in order to reduce variations in aberrations caused by focusing, a floating method in which two or more lens units are moved when focusing is sometimes used.

US Patent No. 2015/0323764 describes an optical system including a positive first lens unit, a negative second lens unit, a positive third lens unit, a negative fourth lens unit, and a positive fifth lens unit, which are disposed in this order from an object side to an image side. In the optical system described in US Patent No. 2015/0323764, when focusing from infinity to a close distance, the second lens unit and the fourth lens unit are moved to the image side.

In US Patent No. 2015/0323764, a lens unit having a relatively strong positive refractive power is disposed closest to the image side. In this configuration, the power arrangement comes closer to becoming a retrofocus type, as a result of which it is sometimes difficult to sufficiently shorten the overall lens length.

SUMMARY OF THE INVENTION

The present invention makes it possible to reduce the size of an optical system in which a plurality of lenses are moved when focusing.

According to a first aspect of the present invention, there is provided an optical system including a front lens group and a rear lens group that are disposed in order from an object side to an image side of the optical system, the front lens group having a positive refractive power and the rear lens group having a negative refractive power. The rear lens group consists of a lens unit Ln1 that is arranged to move towards the image side when focusing from infinity to a close distance and that has a negative refractive power, and a lens unit Ln2 that is disposed closer to the image side than the lens unit Ln1 and that has a negative refractive power. The front lens group includes a lens unit Lpf arranged to move during focusing. In addition, the following conditional expression is satisfied: $-10.00<Dn1/fn2<-0.15$, where $Dn1$ is an interval between the lens unit Ln1 and the lens unit Ln2 when focusing at infinity, and $fn2$ is a focal length of the lens unit Ln2.

According to a second aspect of the present invention, there is provided an image pickup apparatus including an optical system and an image pickup element that photoelectrically converts an optical image that is formed by the optical system. The optical system includes a front lens group and a rear lens group that are disposed in order from an object side to an image side of the optical system, the front lens group having a positive refractive power and the rear lens group having a negative refractive power. The rear lens group consists of a lens unit Ln1 that is arranged to move towards the image side when focusing from infinity to a close distance and that has a negative refractive power, and a lens unit Ln2 that is disposed closer to the image side than the lens unit Ln1 and that has a negative refractive power. The front lens group includes a lens unit Lpf arranged to move during focusing. In addition, the following conditional expression is satisfied: $-10.00<Dn1/fn2<-0.15$, where $Dn1$ is an interval between the lens unit Ln1 and the lens unit Ln2 when focusing at infinity, and $fn2$ is a focal length of the lens unit Ln2.

Further features of the present invention will become apparent from the following description of exemplary embodiments with reference to the attached drawings.

BRIEF DESCRIPTION OF THE DRAWINGS

FIGS. 6A and 6B are aberration diagrams of the optical system according to the third embodiment.

DESCRIPTION OF THE EMBODIMENTS

Figure 1A:
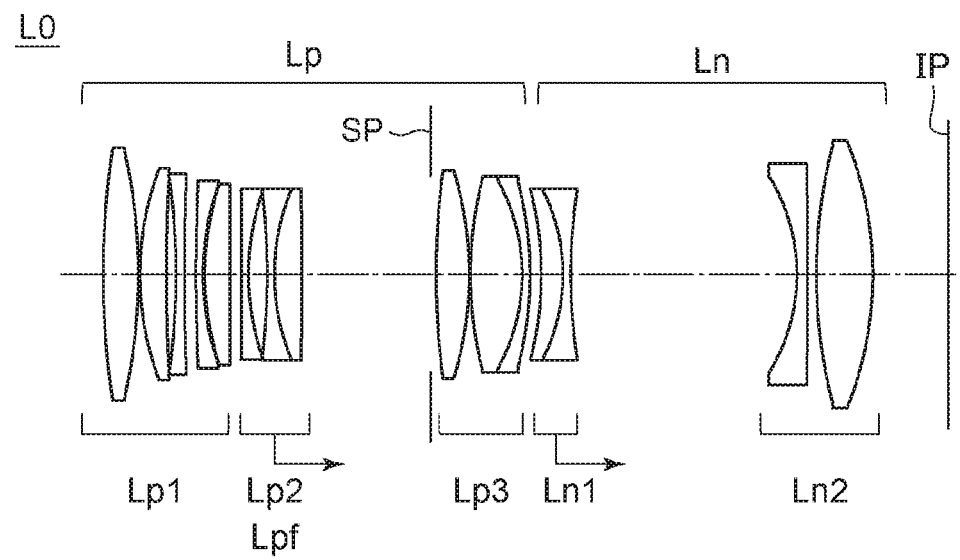
FIGS. 1A and 1B are sectional views of an optical system according to a first embodiment.
Figure 1B:
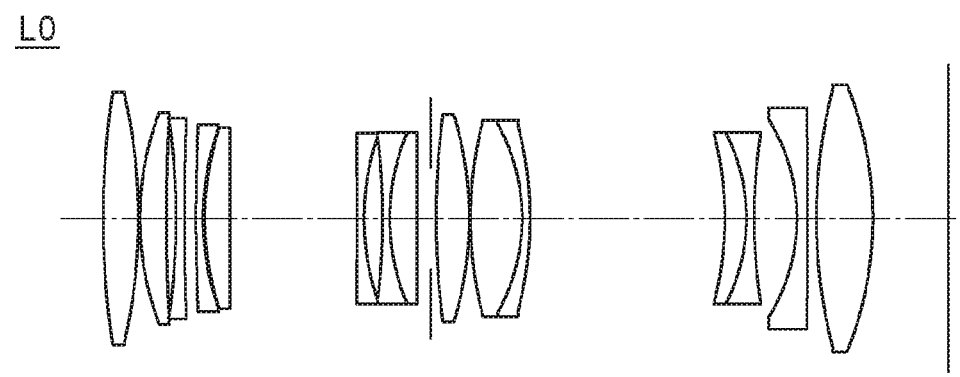
Figure 2A:
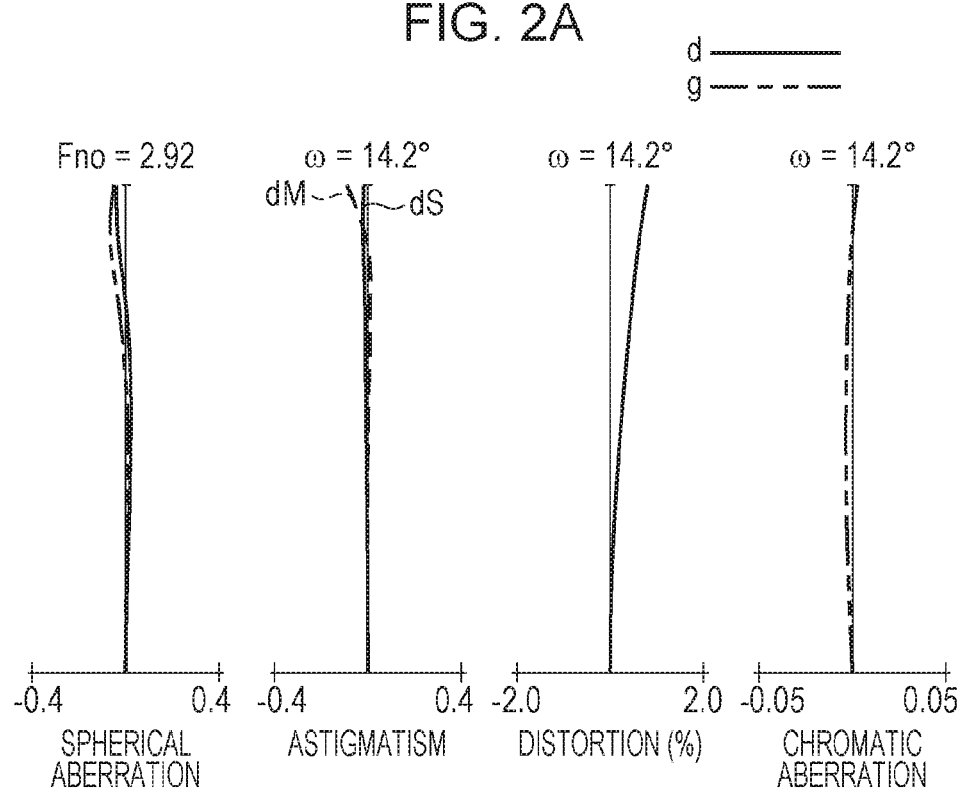
FIGS. 2A and 2B are aberration diagrams of the optical system according to the first embodiment.
Figure 2B:
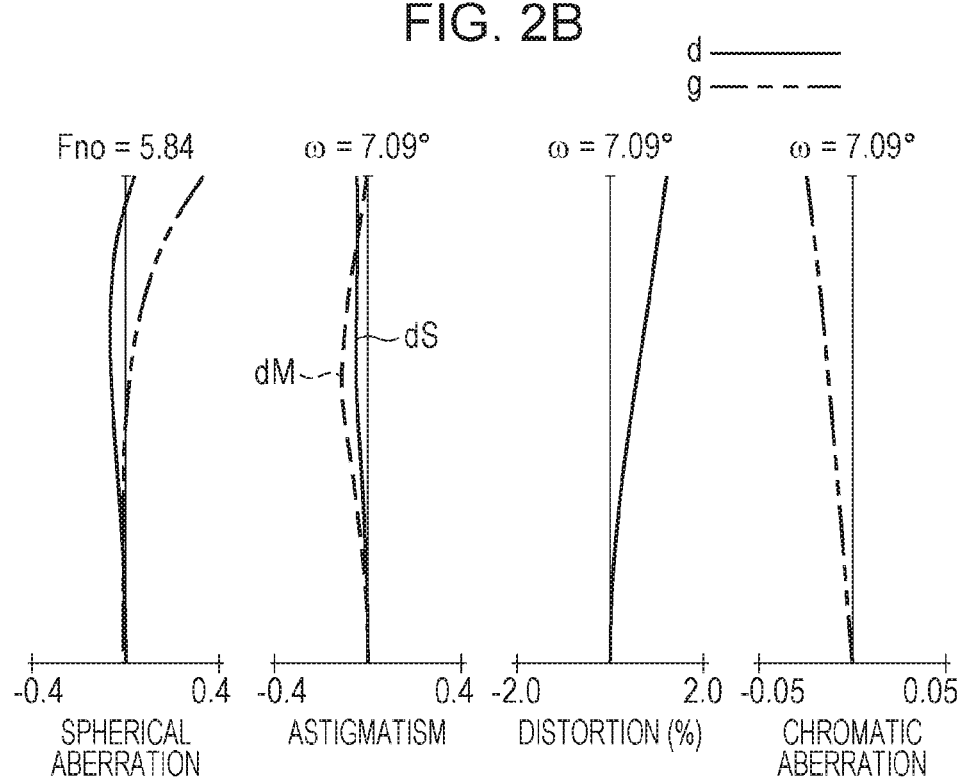
Figure 3A:
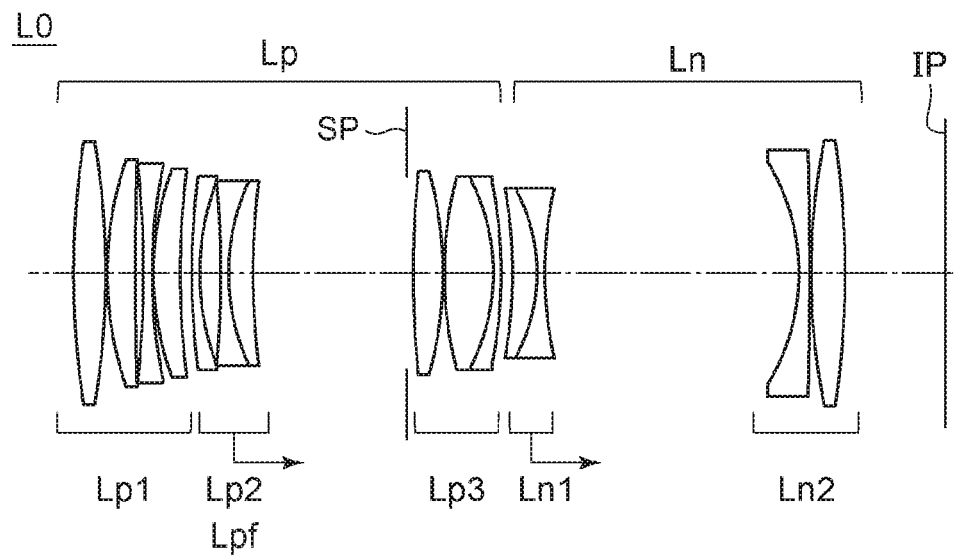
FIGS. 3A and 3B are sectional views of an optical system according to a second embodiment.
Figure 3B:
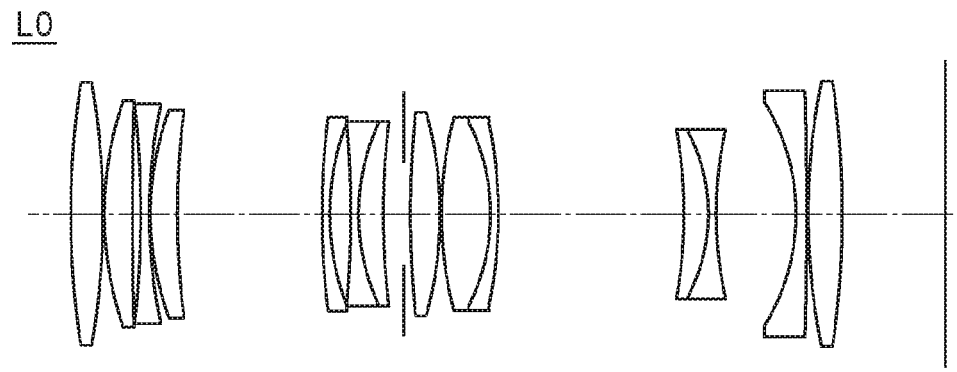
Figure 4A:
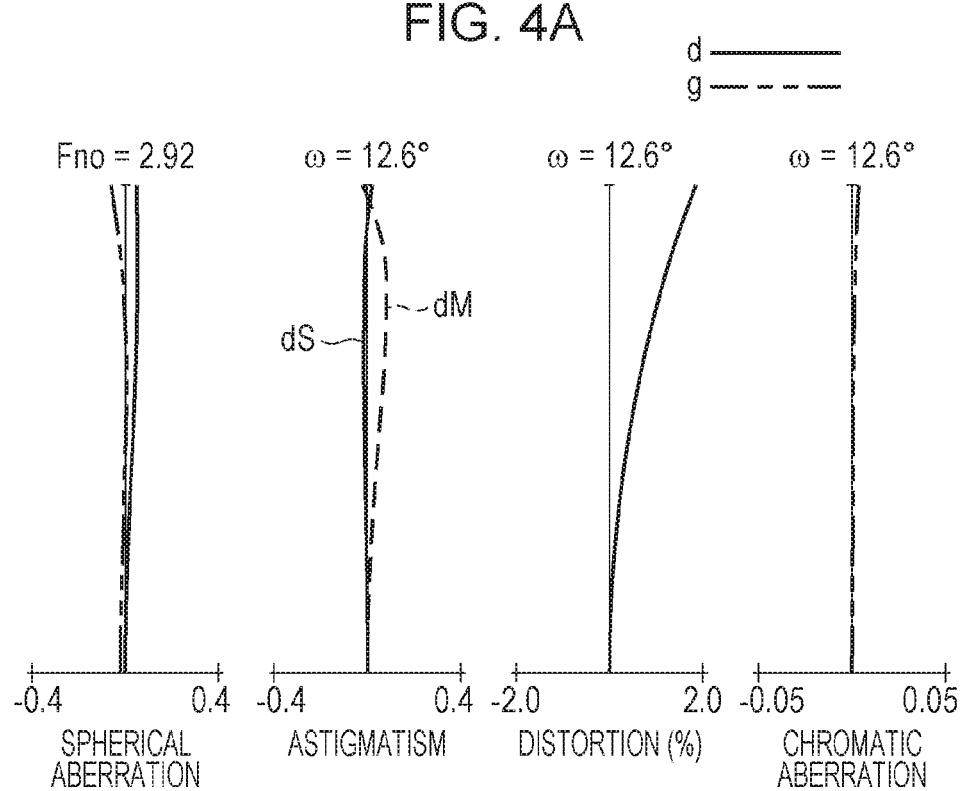
FIGS. 4A and 4B are aberration diagrams of the optical system according to the second embodiment.
Figure 4B:
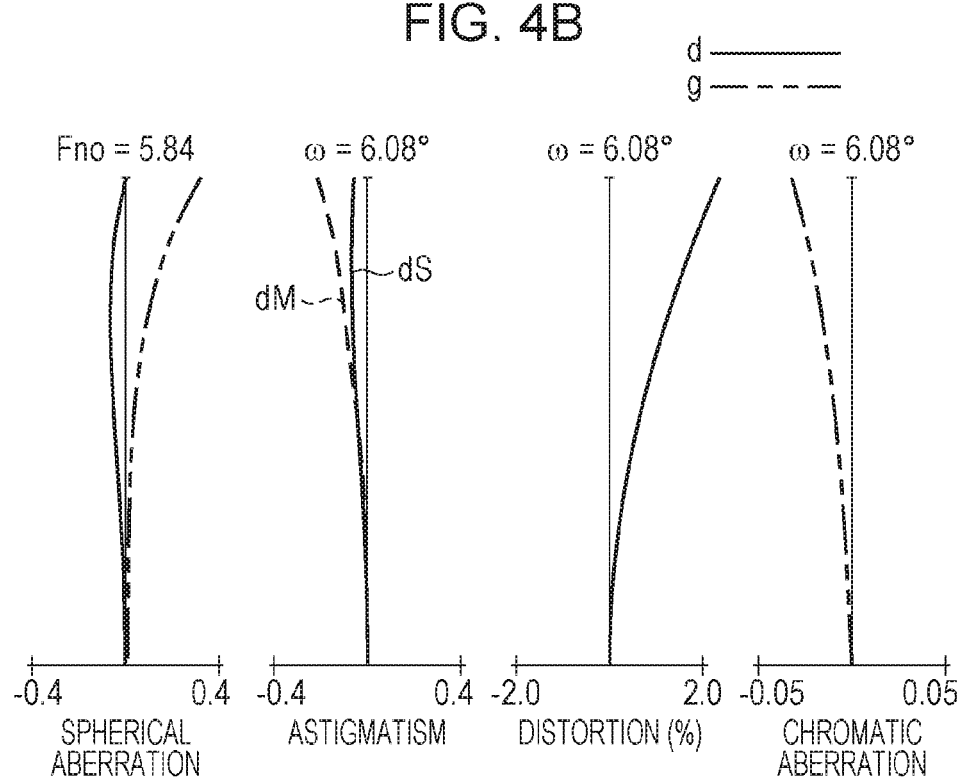
Figure 5A:
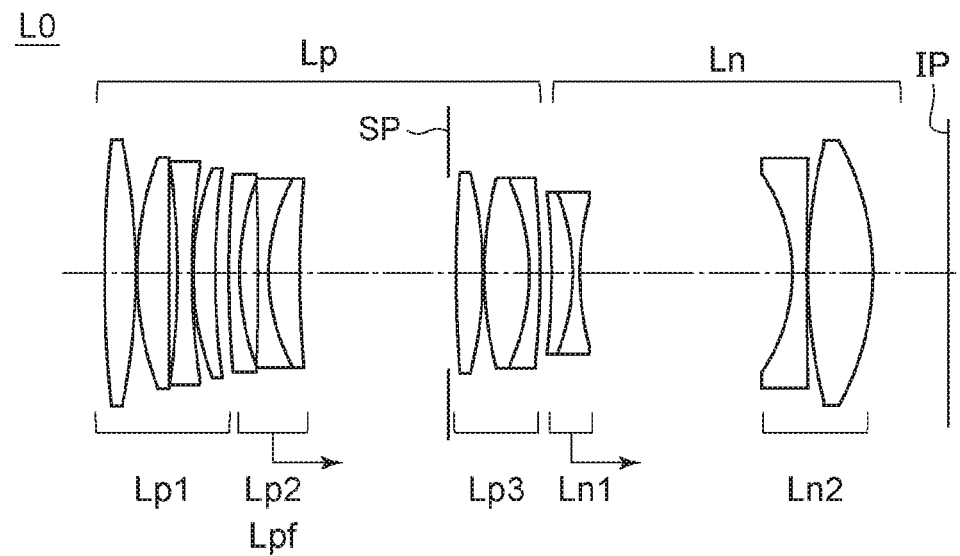
FIGS. 5A and 5B are sectional views of an optical system according to a third embodiment.
Figure 5B:
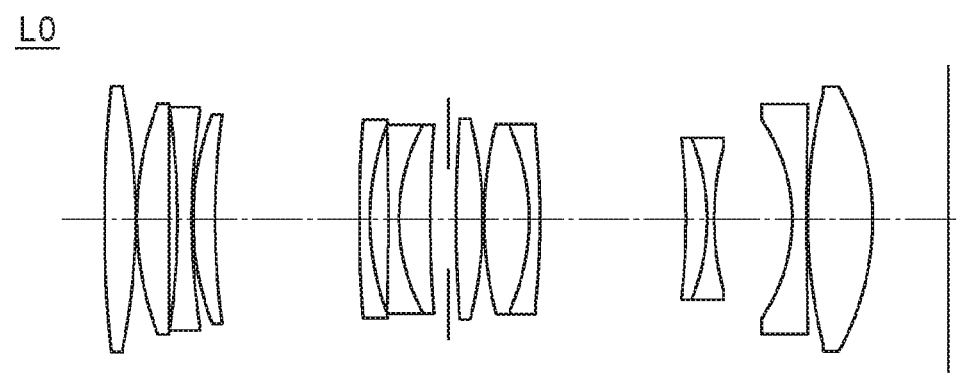
Figure 7A:
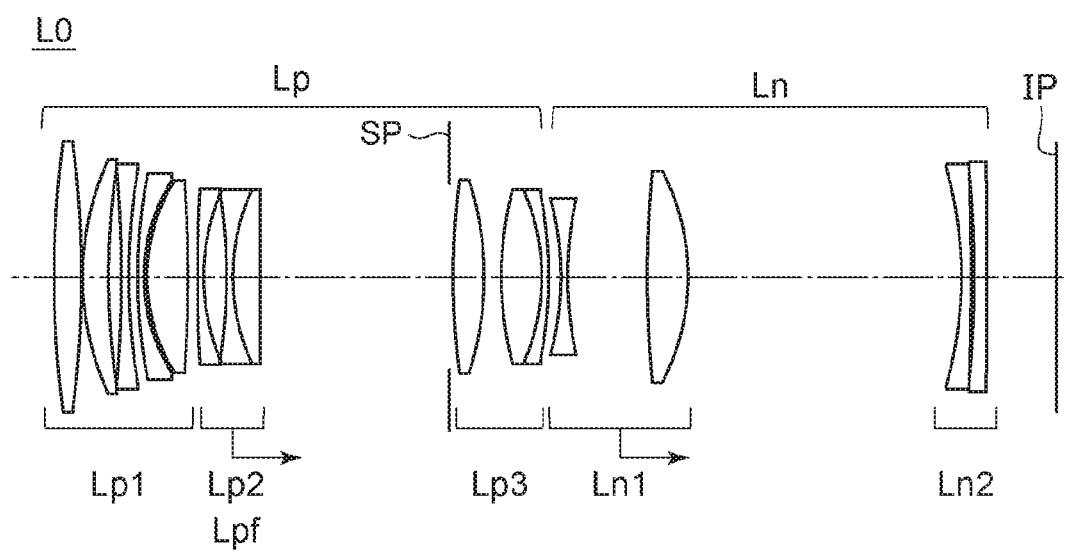
FIGS. 7A and 7B are sectional views of an optical system according to a fourth embodiment.
Figure 7B:
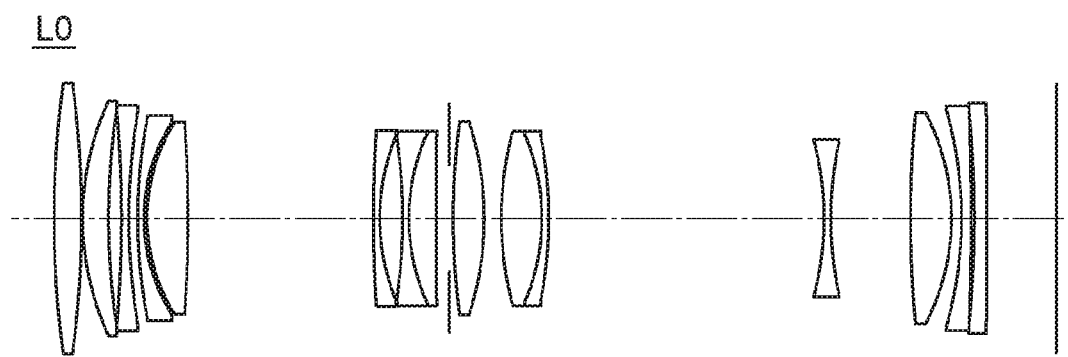
Figure 8A:
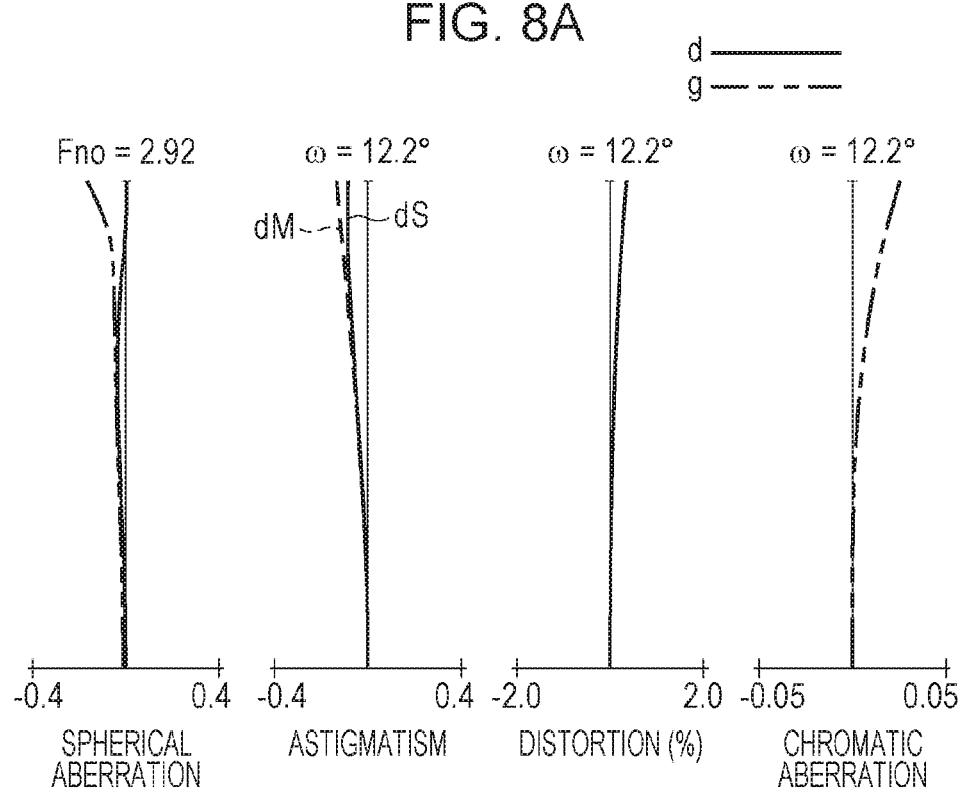
FIGS. 8A and 8B are aberration diagrams of the optical system according to the fourth embodiment.
Figure 8B:
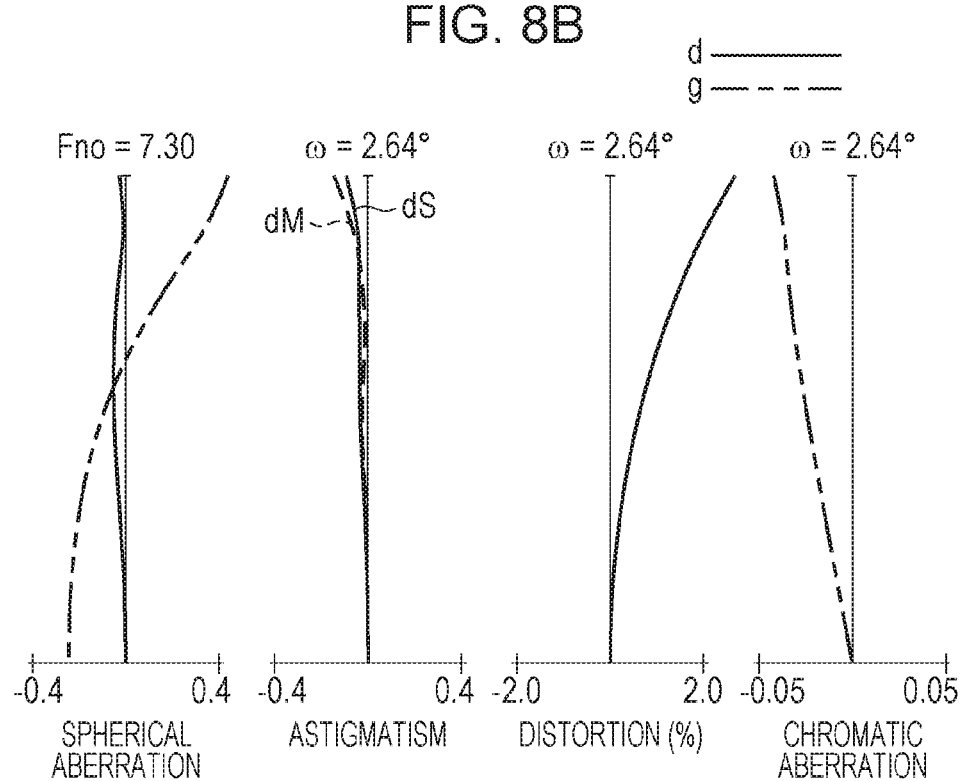
Figure 9A:
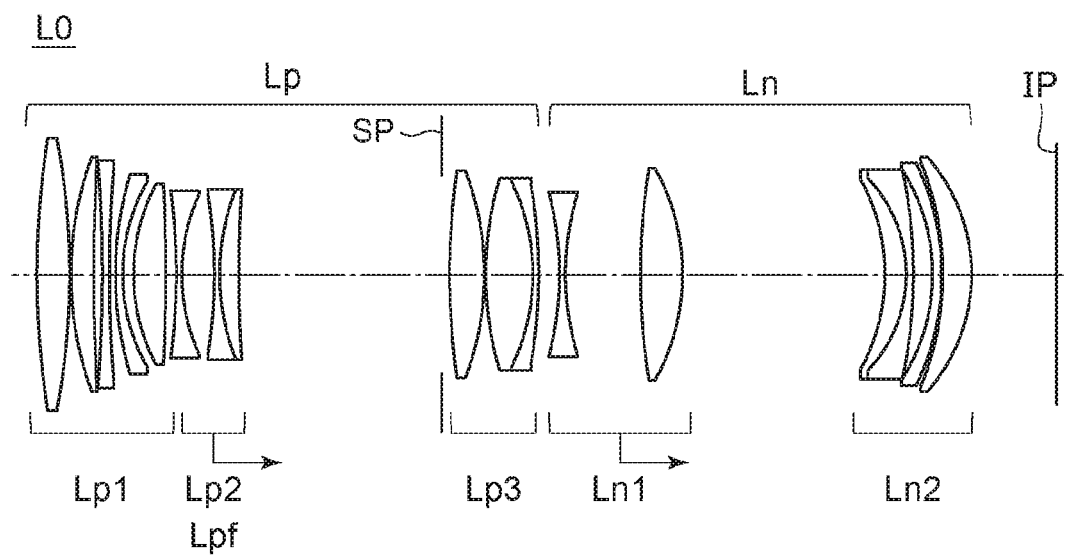
FIGS. 9A and 9B are sectional views of an optical system according to a fifth embodiment.
Figure 9B:
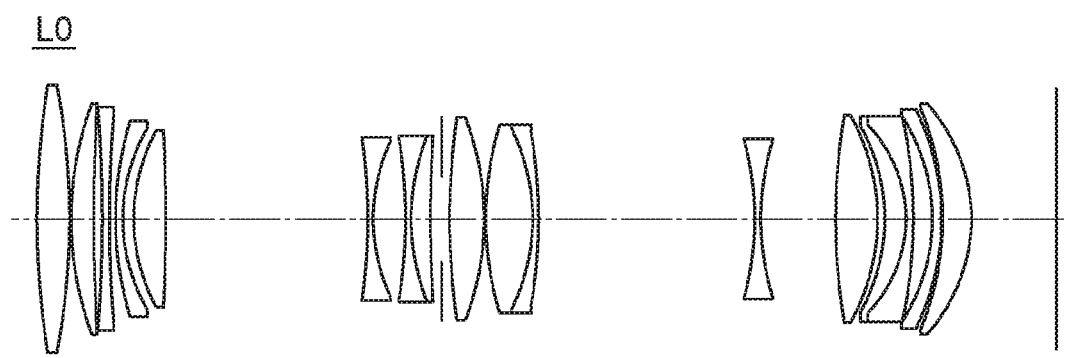
Figure 10A:
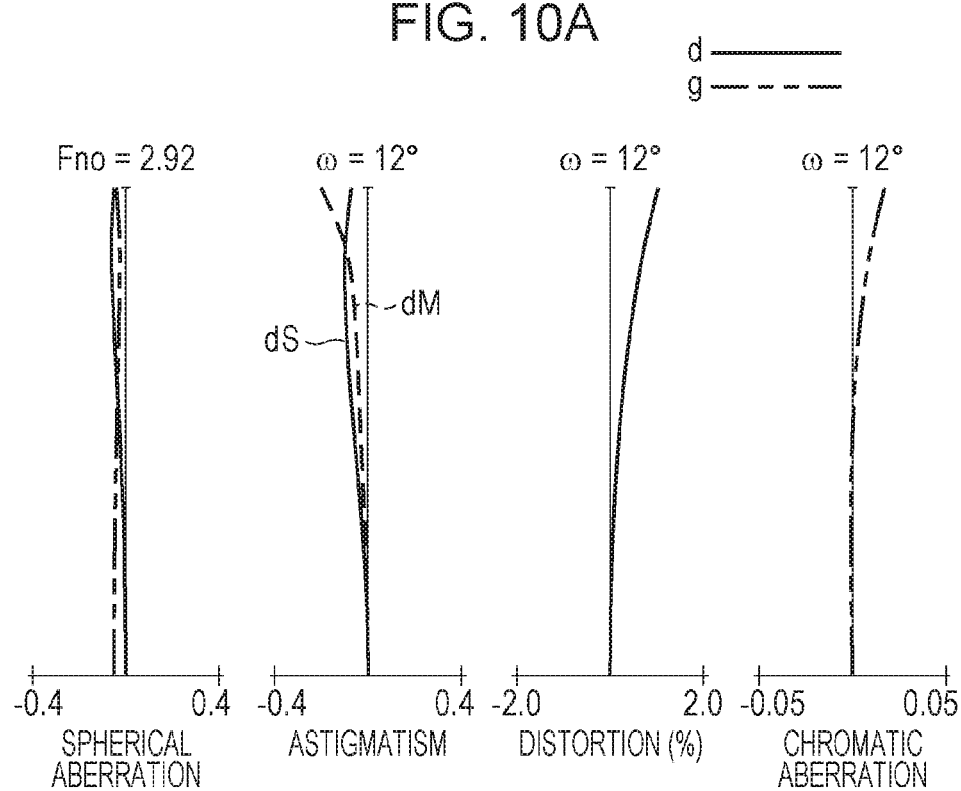
FIGS. 10A and 10B are aberration diagrams of the optical system according to the fifth embodiment.
Figure 10B:
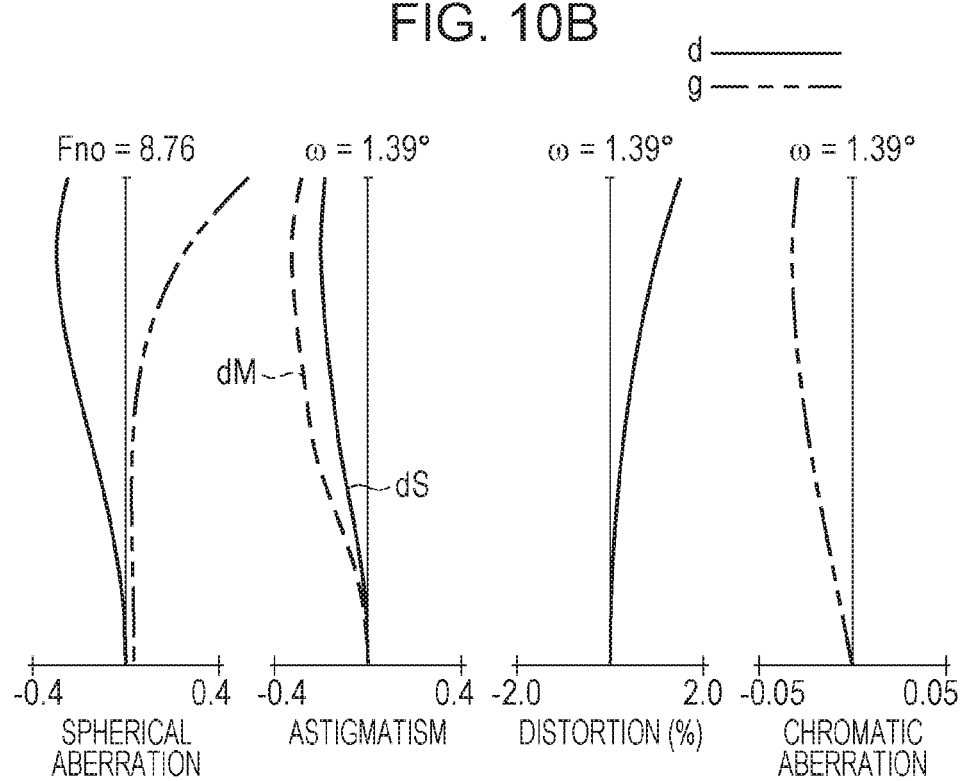

Embodiments of an optical system and an image pickup apparatus including the optical system according to the present invention are described with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

FIGS. 1A, 3A, 5A, 7A, and 9A are sectional views of optical systems according to respective first to fifth embodiments when focusing at infinity. FIGS. 1B, 3B, 5B, 7B, and 9B are sectional views of the optical systems according to the respective first to fifth embodiments when focusing at a close distance. The optical systems according to the respective embodiments are optical systems that are used in image pickup apparatuses, such as digital video cameras, digital still cameras, broadcast cameras, silver-halide film cameras, or monitoring cameras.

In each sectional view of the lenses, the left side is an object side and the right side is an image side. The optical systems according to the respective embodiments include a plurality of lens units. "Lens unit" in the specification of the present application refers to a unit of lenses that move together or that are stationary when focusing. That is, in the optical systems according to the respective embodiments, when focusing from infinity to a close distance, the interval between adjacent lens units is changed. A lens unit may include one lens or may include a plurality of lenses. A lens unit may include an aperture stop.

The optical systems L0 according to the respective embodiments each include a front lens group Lp and a rear lens group Ln that are disposed in this order from the object side to the image side, the front lens group Lp having a positive refractive power and the rear lens group Ln having a negative refractive power.

In each sectional view of the lenses, Lpi denotes an ith lens unit (i is a natural number) from the object side among the lens units included in the front lens group Lp. Lni denotes an ith lens unit (i is a natural number) from the object side among the lens units included in the rear lens group Ln.

SP denotes an aperture stop. IP denotes an image plane. When the optical systems according to the respective embodiments are used as photographing optical systems of digital still cameras or digital video cameras, an image pickup surface of a solid state image pickup element (a photoelectric conversion element), such as a CCD sensor or a CMOS sensor, is disposed in the image plane. When the optical systems according to the respective embodiments are used as photographing optical systems of silver-halide film cameras, a photosensitive surface corresponding to a film surface is placed in the image plane IP.

The optical systems L0 according to the respective embodiments are formed so that, when focusing, at least one lens unit in the front lens group Lp and a lens unit Ln1 (rear focus lens unit Ln1) disposed closest to the object side in the rear lens group Ln are moved. In the front lens group Lp, the lens unit that is moved when focusing is also called a lens unit Lpf (front focus lens unit Lpf) below. The arrows in each sectional view of the lenses denote the directions of movements of the lens units when focusing from infinity to a close distance. The lens unit Lpf and the lens unit Ln1 move in different paths when focusing. Therefore, the focusing may be a floating method, and, in particular, the optical performance when focusing at a close distance can be increased.

FIGS. 2, 4, 6, 8, and 10 are aberrations diagrams of the respective optical systems according to the first to fifth embodiments. In the aberration diagrams, diagram A is an aberration diagram when focusing at infinity and diagram B is an aberration diagram when focusing at a close distance.

In each spherical aberration diagram, Fno denotes an F-number and the spherical aberration amount with respect to a d line (wavelength: 587.6 nm) and to a g line (wavelength: 435.8 nm) is shown. In each astigmatism diagram, dS denotes the astigmatism amount in a sagittal image plane, and dM denotes the astigmatism amount in a meridional image plane. Each distortion aberration diagram shows the distortion aberration amount with respect to the d line. Each chromatic aberration diagram shows the chromatic aberration amount with respect to the g line. ω denotes an image pickup half angle of field (°).

Next, distinctive configurations of the optical systems according to the respective embodiments are described.

The optical systems according to the respective embodiments include the front lens group Lp having a positive refractive power and the rear lens group Ln having a negative refractive power. In this way, by providing a power arrangement of a telephoto type, the overall length is reduced. When focusing, the lens unit Ln1 on the object side in the rear lens group Ln is used for the focusing. Therefore, a light ray that is converged by the front lens group Lp is incident upon the lens unit Ln1, so that it is possible to reduce the diameter of the lens unit Ln1.

The optical systems according to the respective embodiments satisfy Conditional Expression (1) below. Here, Dn1 denotes the interval between the lens unit Ln1 and a lens unit Ln2 (negative lens unit Ln2) when focusing at infinity, and fn2 denotes the focal length of the lens unit Ln2:

$$-10.00 < Dn1/fn2 < -0.15 \quad (1)$$

Conditional Expression (1) prescribes the focal length of the lens unit Ln2.

When the negative refractive power of the lens unit Ln2 becomes weak so as to cause Dn1/fn2 to be greater than the upper limit value in Conditional Expression (1), the tendency with which the power arrangement is of the telephoto type is weakened and the overall length of the optical systems L0 is increased. When the negative refractive power of the lens unit Ln2 becomes strong so as to cause Dn1/fn2 to be less than the lower limit value in Conditional Expression (1), this is advantageous in reducing the overall length of the lenses, but makes it difficult to properly correct field curvature and distortion.

The numerical range of Conditional Expression (1) is desirably set to a range of Conditional Expression (1a) below, and is more desirably set to a range of Conditional Expression (1b):

$$-5.00 < Dn1/fn2 < -0.16 \quad (1a)$$

$$-1.00 < Dn1/fn2 < -0.18 \quad (1b)$$

Next, in the optical systems L0 according to the respective embodiments, desirable configurations to be satisfied are described.

In the optical systems L0 according to the respective embodiments, it is desirable that the front lens group Lp include a lens unit Lp1 (first lens unit) having a positive refractive power and a lens unit Lpf having a negative refractive power in this order from the object side. That is, desirably, the lens unit Lpf that moves when focusing in the front lens group Lp is disposed adjacent to the image side of the lens unit Lp1 disposed closest to the object side in the front lens group Lp and having a positive refractive power, and has a negative refractive power. It is desirable that the lens unit Lpf move to the image side when focusing from infinity to a close distance.

The above-described configuration makes it possible to effectively reduce variations in aberrations, caused by focusing, occurring in the lens unit Ln1 and to increase maximum photographing magnification while maintaining high optical performance.

Further, in the optical systems L0 according to the respective embodiments, it is desirable that the front lens group Lp include a lens unit Lp3 (third lens unit) disposed on the image side of the lens unit Lpf and having a positive refractive power. That is, in the optical systems L0 according to the respective embodiments, it is desirable that the front lens group Lp include the lens unit Lp1, the lens unit Lpf (Lp2), and the lens unit Lp3 that are disposed in this order from the object side to the image side, the lens unit Lp1 having a positive refractive power, the lens unit Lpf (Lp2) having a negative refractive power, and the lens unit Lp3 having a positive refractive power. This makes it possible to further converge the light ray incident upon the lens unit Ln1 and to further reduce the size of the lens unit Ln1.

When the number of lens units that move when focusing is increased, a focusing mechanism becomes complicated and a larger space for disposing the focusing mechanism is required. Therefore, in the optical systems according to the respective embodiments, it is desirable that the lens units that move when focusing be only the lens unit Lpf and the lens unit Ln1.

Next, conditions that are desirably to be satisfied by the optical systems according to the respective embodiments are described. It is desirable that the optical systems according to the respective embodiments satisfy one or more of Conditional Expressions (2) to (12) below. Here, f denotes the focal length of each optical system L0 when focusing at infinity. fp denotes the combined focal length of the front lens group Lp when focusing at infinity. fp1 denotes the focal length of the lens unit Lp1. fpf denotes the focal length of the lens unit Lpf. fn1 denotes the focal length of the lens unit Ln1. fn2 denotes the focal length of the lens unit Ln2. Mn1 denotes the amount of movement of the lens unit Ln1 when focusing from infinity to a closest distance. Mpf denotes the amount of movement of the lens unit Lpf when focusing from infinity to the closest distance. The amount of movement of the lens units to the image side is positive.

β mod denotes the lateral magnification of each optical system L0 when focusing at a closest distance. βn1 denotes the lateral magnification of the lens unit Ln1 when focusing at infinity. βn2 denotes the lateral magnification of the lens unit Ln2 when focusing at infinity. βpf denotes the lateral magnification of the lens unit Lpf when focusing at infinity. βpfmod denotes the lateral magnification of the lens unit Lpf when focusing at the closest distance. βr denotes the combined lateral magnification of all of the lens units disposed on the image side of the lens unit Lpf when focusing at infinity.

$$-0.80 < Mn1/fn1 < 0.00 \quad (2)$$

$$-2.00 < Mpf/fpf < -0.40 \quad (3)$$

$$-7.00 < (1-\beta n1^2) \times \beta n2^2 < -1.00 \quad (4)$$

$$-7.00 < (1-\beta pf^2) \times \beta r^2 < -2.00 \quad (5)$$

$$0.10 < fp/f < 0.90 \quad (6)$$

$$0.40 < fp1/f < 1.00 \quad (7)$$

$$-1.00 < fpf/f < -0.10 \quad (8)$$

$$-2.50 < fp1/fpf < -1.00 \quad (9)$$

$$-30.00 < \beta pf < -2.00 \quad (10)$$

$$-3.00 < \beta pf\,mod < -0.50 \quad (11)$$

$$0.50 < -\beta\,mod < 5.00 \quad (12)$$

Conditional Expressions (2) and (3) are related to the focal length of the lens unit Ln1 and the focal length of the lens unit Lpf. When the negative refractive power of the lens units that move when focusing become strong so as to cause Mn1/fn1 and Mpf/fpf to be less than the lower limit values of respective Conditional Expressions (2) and (3), variations in spherical aberration and field curvature caused by the focusing are increased, and it becomes difficult to properly maintain optical performance. When Mn1/fn1 and Mpf/fpf are greater than the respective upper limit values, the amounts of movement of the lens units when focusing are increased, as a result of which it becomes difficult to sufficiently reduce the overall length of the optical systems L0.

Conditional Expressions (4) and (5) are related to the focusing sensitivity of the lens unit Ln1 and the focusing sensitivity of the lens unit Lpf. When the absolute values of the respective focusing sensitivities are increased so as to cause $(1-\beta n1^2) \times \beta n2^2$ and $(1-\beta pf^2) \times \beta r^2$ to be less than the lower limit values of respective Conditional Expressions (4) and (5), variations in spherical aberration and field curvature caused by the focusing are increased, and it becomes difficult to properly maintain optical performance. When the absolute values of the focusing sensitivities are reduced so as to cause $(1-\beta n1^2) \times \beta n2^2$ and $(1-\beta pf^2) \times \beta r^2$ to be greater than the upper limit values of respective Conditional Expressions (4) and (5), the amounts of movement of the lens units when focusing are increased, as a result of which it becomes difficult to sufficiently reduce the overall length of the optical systems L0.

Conditional Expression (6) is related to the focal length of the front lens group Lp. When the positive refractive power of the front lens group Lp becomes strong so as to cause fp/f to be less than the lower limit value of Conditional Expression (6), variations in spherical aberration and field curvature caused by the focusing are increased, and it becomes difficult to properly maintain optical performance. When the refractive power of the front lens group Lp becomes weak so as to cause fp/f to be greater than the upper limit value of Conditional Expression (6), the tendency with which the power arrangement is of the telephoto type is weakened, as a result of which it becomes difficult to reduce the overall length of each optical system L0.

Conditional Expression (7) is related to the focal length of the lens unit Lp1 when the lens unit Lpf is disposed on the image side of the lens unit Lp1 positioned closest to the object side of the front lens group Lp. When the positive refractive power of the lens unit Lp1 becomes strong so as to cause fp1/f to be less than the lower limit value of Conditional Expression (7), variations in spherical aberration and field curvature caused by the focusing are increased, and it becomes difficult to properly maintain optical performance. When the positive refractive power of the lens unit Lp1 becomes weak so as to cause fp1/f to be greater than the upper limit value of Conditional Expression (7), the conversion effect of light rays by the lens unit Lp1 is reduced, and the diameter of the lens unit Lpf that moves when focusing is increased.

Conditional Expression (8) is related to the focal length of the lens unit Lpf. When the negative refractive power of the lens unit Lpf becomes weak so as to cause fpf/f to be less than the lower limit value of Conditional Expression (8), the amount of movement when focusing is increased, as a result of which it becomes difficult to sufficiently reduce the overall length of each optical system L0. When the negative refractive power of the lens unit Lpf becomes strong so as to cause fpf/f to be greater than the upper limit value of Conditional Expression (8), variations in spherical aberration and field curvature caused by the focusing are increased, and it becomes difficult to properly maintain optical performance.

Conditional Expression (9) is related to the focal length of the lens unit Lp1 and the focal length of the lens unit Lpf when the lens unit Lpf is disposed on the image side of the lens unit Lp1 that is positioned closest to the object side of the front lens group Lp. When fp1/fpf is less than the lower limit value of Conditional Expression (9) and the positive refractive power of the lens unit Lp1 becomes weaker than the negative refractive power of the lens unit Lpf, the tendency with which the power arrangement is of the telephoto-type is weakened, as a result of which it becomes difficult to sufficiently reduce the overall lens length of each optical system L0. When the positive refractive power of the lens unit Lp1 becomes stronger than the negative refractive power of the lens unit Lpf so as to cause fp1/fpf to be greater than the upper limit value of Conditional Expression (9), it is difficult to properly correct field curvature and distortion.

Conditional Expressions (10) and (11) are related to the lateral magnification of the lens unit Lpf. When the light-ray diverging effect of the lens unit Lpf is reduced so as to cause βpf and βpfmod to be less than the lower limit values of respective Conditional Expressions (10) and (11), it is difficult to properly correct field curvature and distortion. When the light-ray diverging effect of the lens unit Lpf is increased so as to cause βpf and βpfmod to be greater than the upper limit values of respective Conditional Expressions (10) and (11), variations in spherical aberration and field curvature caused by the focusing are increased, and it becomes difficult to properly maintain optical performance.

Conditional Expression (12) is related to the lateral magnification of the entire system when focusing at a closest distance. When −β mod becomes less than the lower limit value of Conditional Expression (12), the lateral magnification at the closest distance becomes insufficient, and it becomes difficult to sufficiently enlarge an object and photograph the object. This is not desirable. When −β mod becomes greater than the upper limit value of Conditional Expression (12), the amount of movement when focusing is increased, as a result of which it becomes difficult to sufficiently reduce the overall length of each optical system L0. This is not desirable.

It is desirable that the numerical ranges of Conditional Expressions (2) to (12) be set to the numerical ranges of Conditional Expressions (2a) to (12a) below:

$$-0.60 < Mn1/fn1 < -0.02 \tag{2a}$$

$$-2.00 < Mpf/fpf < -0.45 \tag{3a}$$

$$-6.00 < (1-\beta n1^2) \times \beta n2^2 < -2.00 \tag{4a}$$

$$-5.00 < (1-\beta pf^2) \times \beta r^2 < -2.20 \tag{5a}$$

$$0.20 < fp/f < 0.70 \tag{6a}$$

$$0.45 < fp1/f < 0.80 \tag{7a}$$

$$-0.80 < fpf/f < -0.20 \tag{8a}$$

$$-2.00 < fp1/fpf < -1.20 \tag{9a}$$

$$-25.00 < \beta pf < -2.50 \tag{10a}$$

$$-2.00 < \beta pf \, \text{mod} < -0.60 \tag{11a}$$

$$0.70 < -\beta \, \text{mod} < 4.00 \tag{12a}$$

It is more desirable that the numerical ranges of Conditional Expressions (2) to (12) be set to the numerical ranges of Conditional Expressions (2b) to (12b) below:

$$-0.50 < Mn1/fn1 < -0.03 \tag{2b}$$

$$-2.00 < Mpf/fpf < -0.47 \tag{3b}$$

$$-5.00 < (1-\beta n1^2) \times \beta n2^2 < -2.50 \tag{4b}$$

$$-4.00 < (1-\beta pf^2) \times \beta r^2 < -2.40 \tag{5b}$$

$$0.30 < fp/f < 0.50 \tag{6b}$$

$$0.49 < fp1/f < 0.65 \tag{7b}$$

$$-0.60 < fpf/f < -0.30 \tag{8b}$$

$$-1.70 < fp1/fpf < -1.40 \tag{9b}$$

$$-20.00 < \beta pf < -2.90 \tag{10b}$$

$$-1.50 < \beta pf \, \text{mod} < -0.63 \tag{11b}$$

$$0.90 < -\beta \, \text{mod} < 3.00 \tag{12b}$$

Next, the optical systems according to the respective embodiments are described in detail.

In the optical systems L0 according to the respective embodiments, the front lens group Lp includes the lens unit Lp1, the lens unit Lp2 (Lpf), and the lens unit Lp3 that are disposed in this order from the object side to the image side, the lens unit Lp1 having a positive refractive power, the lens unit Lp2 (Lpf) having a negative refractive power, and the lens unit Lp3 having a positive refractive power. The rear lens group Ln includes the lens unit Ln1 having a negative refractive power and the lens unit Ln2 having a negative refractive power, the lens unit Ln1 and the lens unit Ln2 being disposed from the object side to the image side. In the optical systems L0 according to the respective embodiments, by moving the lens unit Lp2 and the lens unit Ln1 to the image side, focusing is performed from infinity to a close distance. The lens unit Lp1, the lens unit Lp3, and the lens unit Ln2 are stationary when focusing.

In the first embodiment, the optical system has a photographing viewing angle of 28.4 degrees and an F-number of 2.8.

In the second embodiment, the optical system has a photographing viewing angle of 25.2 degrees and an F-number of 2.8.

In the third embodiment, the optical system has a photographing viewing angle of 24.6 degrees and an F-number of 2.8.

In the fourth embodiment, the optical system has a photographing viewing angle of 24.4 degrees and an F-number of 2.8.

In the fifth embodiment, the optical system has a photographing viewing angle of 24.0 degrees and an F-number of 2.8.

Numerical Examples 1 to 5 corresponding to the respective first to fifth embodiments are indicated below.

In pieces of surface data regarding the respective numerical examples, r (mm) denotes the curvature radius of each optical surface, and d (mm) denotes the on-axis interval (the distance on the optical axis) between an mth surface and an mth+1 surface. However, m denotes the number of the surface counted from a light incident side. nd denotes the refractive index with respect to the d line of each optical member, and vd denotes the Abbe number of the optical members.

In each numerical example, d, the focal length (mm), the F-number, and the half angle of view (°) are all values when the optical systems according to the respective embodiments are focused on an object at infinity. Back focus BF is the distance from a final lens surface to the image plane. The overall lens length is a value obtained by adding the back focus to the distance from a first lens surface to the final lens surface.

Numerical Example 1

Units: mm

Surface Data

| Surface Number | r | d | nd | vd |
|---|---|---|---|---|
| 1 | 119.769 | 4.95 | 1.59522 | 67.7 |
| 2 | −78.387 | 0.20 | | |
| 3 | 42.021 | 3.75 | 1.69680 | 55.5 |
| 4 | 261.454 | 1.33 | | |
| 5 | −96.584 | 1.20 | 1.92286 | 18.9 |
| 6 | 415.073 | 1.60 | | |
| 7 | 261.175 | 1.00 | 1.69895 | 30.1 |
| 8 | 37.911 | 0.26 | | |
| 9 | 41.132 | 3.54 | 1.83481 | 42.7 |
| 10 | −1723.422 | (variable) | | |
| 11 | −1684.155 | 1.00 | 2.00100 | 29.1 |
| 12 | 35.839 | 2.62 | | |
| 13 | −91.834 | 1.00 | 1.88300 | 40.8 |
| 14 | 30.951 | 3.81 | 1.95906 | 17.5 |
| 15 | −3300.626 | (variable) | | |
| 16(aperture stop) | ∞ | 0.72 | | |
| 17 | 110.584 | 4.65 | 1.77250 | 49.6 |
| 18 | −50.295 | 0.20 | | |
| 19 | 55.762 | 7.23 | 1.60300 | 65.4 |
| 20 | −27.411 | 1.10 | 1.84666 | 23.8 |
| 21 | −51.442 | (variable) | | |
| 22 | −47.643 | 3.03 | 2.00069 | 25.5 |
| 23 | −26.469 | 1.10 | 1.68414 | 46.5 |
| 24 | 77.082 | (variable) | | |
| 25 | −26.369 | 1.50 | 1.92119 | 24.0 |
| 26 | −956.338 | 1.23 | | |
| 27 | 72.751 | 7.94 | 1.51633 | 64.1 |
| 28 | −50.417 | 10.60 | | |
| Image Plane | ∞ | | | |

Various Data

| | |
|---|---|
| Focal Length | 84.92 |
| F-number | 2.92 |
| Half Angle of View (°) | 14.29 |
| Image Height | 21.64 |
| Overall Lens Length | 120.23 |
| BF | 10.60 |

Magnification

| Object Distance | ∞ | −0.5 | −1.0 |
|---|---|---|---|
| d10 | 1.60 | 9.28 | 17.82 |
| d15 | 18.19 | 10.51 | 1.97 |
| d21 | 1.60 | 8.99 | 27.38 |
| d24 | 31.78 | 24.38 | 6.00 |

Lens Unit Data

| Unit | Starting Surface | Focal Length |
|---|---|---|
| 1 | 1 | 49.77 |
| 2 | 11 | −27.90 |
| 3 | 16 | 25.86 |
| 4 | 22 | −55.95 |
| 5 | 25 | −71.45 |

Numerical Example 2

Units: mm

Surface Data

| Surface Number | r | d | nd | vd |
|---|---|---|---|---|
| 1 | 120.877 | 4.52 | 1.77250 | 49.6 |
| 2 | −109.752 | 0.20 | | |
| 3 | 49.078 | 3.96 | 1.69680 | 55.5 |
| 4 | 549.220 | 1.14 | | |
| 5 | −138.305 | 1.20 | 1.84666 | 23.8 |
| 6 | 73.379 | 0.20 | | |
| 7 | 42.661 | 3.75 | 1.59522 | 67.7 |
| 8 | 112.382 | (variable) | | |
| 9 | 106.128 | 1.10 | 1.80100 | 35.0 |
| 10 | 36.169 | 2.95 | | |
| 11 | −141.363 | 1.10 | 1.88300 | 40.8 |
| 12 | 30.610 | 3.45 | 1.95906 | 17.5 |
| 13 | 103.569 | (variable) | | |
| 14(aperture stop) | ∞ | 0.94 | | |
| 15 | 140.927 | 4.17 | 1.69680 | 55.5 |
| 16 | −53.458 | 0.20 | | |
| 17 | 53.875 | 6.89 | 1.59522 | 67.7 |
| 18 | −28.821 | 1.10 | 1.84666 | 23.8 |
| 19 | −63.777 | (variable) | | |
| 20 | −66.701 | 3.42 | 1.84666 | 23.8 |
| 21 | −24.953 | 1.10 | 1.67300 | 38.1 |
| 22 | 53.309 | (variable) | | |
| 23 | −30.140 | 1.50 | 1.48749 | 70.2 |
| 24 | −671.724 | 0.20 | | |
| 25 | 93.670 | 4.77 | 1.51432 | 64.7 |
| 26 | −130.451 | 14.11 | | |
| Image Plane | ∞ | | | |

Various Data

| | |
|---|---|
| Focal Length | 94.82 |
| F-number | 2.92 |
| Half Angle of View (°) | 12.85 |
| Image Height | 21.64 |
| Overall Lens Length | 124.00 |
| BF | 14.11 |

Magnification

| Object Distance | ∞ | −0.5 | −1.0 |
|---|---|---|---|
| d8 | 1.65 | 9.09 | 20.33 |
| d13 | 21.57 | 14.13 | 2.89 |
| d19 | 1.60 | 10.88 | 26.09 |
| d22 | 35.72 | 26.44 | 11.23 |

Lens Unit Data

| Unit | Starting Surface | Focal Length |
|---|---|---|
| 1 | 1 | 54.38 |
| 2 | 9 | −35.21 |
| 3 | 14 | 30.82 |
| 4 | 20 | −53.94 |
| 5 | 23 | −175.51 |

Numerical Example 3

Units: mm

Surface Data

| Surface Number | r | d | nd | vd |
|---|---|---|---|---|
| 1 | 181.508 | 4.37 | 1.75500 | 52.3 |
| 2 | −93.628 | 0.20 | | |
| 3 | 46.190 | 4.55 | 1.61800 | 63.4 |
| 4 | −3054.076 | 1.15 | | |
| 5 | −108.797 | 2.00 | 1.84666 | 23.8 |
| 6 | 98.570 | 0.19 | | |
| 7 | 41.581 | 3.10 | 1.59522 | 67.7 |
| 8 | 109.862 | (variable) | | |
| 9 | 181.348 | 1.50 | 2.00100 | 29.1 |

Units: mm

| | | | | |
|---|---|---|---|---|
| 10 | 37.857 | 2.58 | | |
| 11 | −389.867 | 1.50 | 1.89190 | 37.1 |
| 12 | 27.600 | 4.38 | 1.95906 | 17.5 |
| 13 | 159.635 | (variable) | | |
| 14(aperture stop) | ∞ | 1.07 | | |
| 15 | 179.704 | 3.78 | 1.80400 | 46.5 |
| 16 | −57.235 | 0.19 | | |
| 17 | 53.636 | 6.32 | 1.75500 | 52.3 |
| 18 | −31.881 | 1.50 | 1.89286 | 20.4 |
| 19 | −120.842 | (variable) | | |
| 20 | −97.161 | 2.97 | 1.92286 | 18.9 |
| 21 | −30.599 | 0.99 | 1.72047 | 34.7 |
| 22 | 39.794 | (variable) | | |
| 23 | −24.877 | 1.99 | 1.75500 | 52.3 |
| 24 | 504.684 | 0.19 | | |
| 25 | 73.407 | 9.13 | 1.48749 | 70.2 |
| 26 | −38.742 | 10.61 | | |
| Image Plane | ∞ | | | |

Various Data

| | |
|---|---|
| Focal Length | 96.96 |
| F-number | 2.92 |
| Half Angle of View (°) | 12.58 |
| Image Height | 21.64 |
| Overall Lens Length | 120.06 |
| BF | 10.61 |

Magnification

| Object Distance | ∞ | −0.5 | −1.0 |
|---|---|---|---|
| d8 | 1.93 | 8.74 | 20.26 |
| d13 | 20.87 | 14.06 | 2.54 |
| d19 | 1.64 | 9.53 | 20.55 |
| d22 | 29.87 | 21.98 | 10.96 |

Lens Unit Data

| Unit | Starting Surface | Focal Length |
|---|---|---|
| 1 | 1 | 52.27 |
| 2 | 9 | −36.62 |
| 3 | 14 | 28.75 |
| 4 | 20 | −47.20 |
| 5 | 23 | −100.37 |

Numerical Example 4

Units: mm

Surface Data

| Surface Number | r | d | nd | vd |
|---|---|---|---|---|
| 1 | 159.686 | 4.40 | 1.80400 | 46.5 |
| 2 | −161.368 | 0.20 | | |
| 3 | 45.012 | 4.12 | 1.75500 | 52.3 |
| 4 | 121.651 | 2.04 | | |
| 5 | −201.515 | 1.20 | 1.89286 | 20.4 |
| 6 | 102.603 | 1.41 | | |
| 7 | 84.890 | 0.97 | 2.00100 | 29.1 |
| 8 | 28.650 | 0.52 | | |
| 9 | 29.222 | 6.49 | 1.83481 | 42.7 |
| 10 | −238.917 | (variable) | | |
| 11 | 227.730 | 1.00 | 1.95375 | 32.3 |
| 12 | 34.625 | 3.66 | | |
| 13 | −85.745 | 1.00 | 1.72000 | 46.0 |
| 14 | 33.107 | 4.37 | 1.95906 | 17.5 |
| 15 | 1872.863 | (variable) | | |
| 16(aperture stop) | ∞ | 0.68 | | |
| 17 | 120.208 | 4.94 | 1.59522 | 67.7 |
| 18 | −50.412 | 2.74 | | |
| 19 | 54.708 | 6.46 | 1.48749 | 70.2 |
| 20 | −34.258 | 1.10 | 1.84666 | 23.8 |
| 21 | −68.301 | (variable) | | |
| 22 | −48.064 | 1.10 | 1.83481 | 42.7 |
| 23 | 58.225 | 12.73 | | |
| 24 | 183.255 | 6.51 | 1.60342 | 38.0 |
| 25 | −36.485 | (variable) | | |
| 26 | −63.376 | 1.50 | 1.95906 | 17.5 |
| 27 | −524.534 | 0.54 | | |
| 28 | −181.278 | 2.00 | 2.00100 | 29.1 |
| 29 | −1831.006 | 11.10 | | |
| Image Plane | ∞ | | | |

Various Data

| | |
|---|---|
| Focal Length | 99.30 |
| F-number | 2.92 |
| Half Angle of View (°) | 12.29 |
| Image Height | 21.64 |
| Overall Lens Length | 161.52 |
| BF | 11.10 |

Magnification

| Object Distance | ∞ | −1.0 | −1.5 |
|---|---|---|---|
| d10 | 1.54 | 20.47 | 29.65 |
| d15 | 30.14 | 11.21 | 2.03 |
| d21 | 1.94 | 28.74 | 43.96 |
| d25 | 43.62 | 16.81 | 1.60 |

Lens Unit Data

| Unit | Starting Surface | Focal Length |
|---|---|---|
| 1 | 1 | 59.01 |
| 2 | 11 | −39.96 |
| 3 | 16 | 37.86 |
| 4 | 22 | −512.58 |
| 5 | 26 | −54.52 |

Numerical Example 5

Units: mm

Surface Data

| Surface Number | r | d | nd | vd |
|---|---|---|---|---|
| 1 | 143.802 | 5.39 | 1.69680 | 55.5 |
| 2 | −120.679 | 0.20 | | |
| 3 | 56.196 | 3.79 | 1.72916 | 54.7 |
| 4 | 314.257 | 1.38 | | |
| 5 | −255.844 | 1.20 | 1.92286 | 18.9 |
| 6 | 220.010 | 1.00 | | |
| 7 | 57.172 | 1.20 | 1.95375 | 32.3 |
| 8 | 31.056 | 1.81 | | |
| 9 | 31.982 | 5.32 | 1.59522 | 67.7 |
| 10 | −268.045 | (variable) | | |
| 11 | −103.641 | 0.90 | 1.80400 | 46.5 |
| 12 | 32.033 | 5.37 | | |
| 13 | −85.685 | 0.90 | 1.51823 | 58.9 |
| 14 | 38.727 | 3.20 | 1.95906 | 17.5 |
| 15 | 225.083 | (variable) | | |
| 16(aperture stop) | ∞ | 1.30 | | |
| 17 | 124.193 | 5.74 | 1.59522 | 67.7 |
| 18 | −47.911 | 0.20 | | |
| 19 | 55.941 | 7.80 | 1.59522 | 67.7 |
| 20 | −35.160 | 0.94 | 1.84666 | 23.8 |
| 21 | −89.240 | (variable) | | |
| 22 | −52.630 | 0.99 | 1.83481 | 42.7 |
| 23 | 45.601 | 12.37 | | |
| 24 | 106.338 | 6.96 | 1.59270 | 35.3 |

-continued

Units: mm

| | | | | |
|---|---|---|---|---|
| 25 | −36.345 | (variable) | | |
| 26 | −32.727 | 3.51 | 1.59270 | 35.3 |
| 27 | −23.215 | 1.21 | 2.00069 | 25.5 |
| 28 | −82.446 | 3.17 | | |
| 29 | −32.333 | 1.50 | 1.67300 | 38.1 |
| 30 | −42.156 | 0.20 | | |
| 31 | −49.146 | 4.74 | 1.85150 | 40.8 |
| 32 | −29.414 | 14.00 | | |
| Image Plane | ∞ | | | |

Various Data

| | |
|---|---|
| Focal Length | 99.75 |
| F-number | 2.92 |
| Half Angle of View (°) | 12.24 |
| Image Height | 21.64 |
| Overall Lens Length | 169.97 |
| BF | 14.00 |

Magnification

| Object Distance | ∞ | −1.0 | −2.0 |
|---|---|---|---|
| d10 | 1.74 | 17.88 | 33.37 |
| d15 | 33.53 | 17.40 | 1.89 |
| d21 | 3.46 | 20.67 | 35.74 |
| d25 | 33.46 | 16.25 | 1.20 |

Lens Unit Data

| Unit | Starting Surface | Focal Length |
|---|---|---|
| 1 | 1 | 49.90 |
| 2 | 11 | −31.55 |
| 3 | 16 | 34.14 |
| 4 | 22 | −921.94 |
| 5 | 26 | −91.30 |

Various values in each of the numerical examples are summarized and indicated in Table 1 below.

TABLE 1

| Conditional Expression | Example 1 | Example 2 | Example 3 | Example 4 | Example 5 |
|---|---|---|---|---|---|
| (1) | −0.44 | −0.20 | −0.30 | −0.80 | −0.37 |
| (2) | −0.46 | −0.45 | −0.40 | −0.08 | −0.04 |
| (3) | −0.58 | −0.53 | −0.50 | −0.70 | −1.00 |
| (4) | −4.30 | −3.76 | −4.57 | −2.57 | −3.34 |
| (5) | −2.59 | −2.98 | −3.43 | −2.78 | −3.85 |
| (6) | 0.40 | 0.45 | 0.40 | 0.49 | 0.43 |
| (7) | 0.59 | 0.57 | 0.54 | 0.59 | 0.50 |
| (8) | −0.33 | −0.37 | −0.38 | −0.40 | −0.32 |
| (9) | −1.78 | −1.54 | −1.43 | −1.48 | −1.58 |
| (10) | −3.01 | −7.34 | −16.84 | −7.72 | −5.19 |
| (11) | −0.66 | −0.96 | −1.15 | −0.83 | −1.09 |
| (12) | 1.00 | 1.00 | 1.00 | 1.50 | 2.00 |

Image Pickup Apparatus

Figure 11:
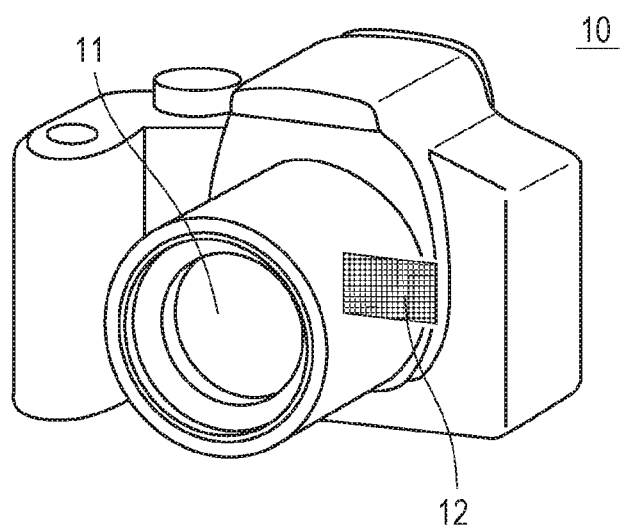
FIG. 11 is a schematic view of an image pickup apparatus.

Next, an embodiment of a digital still camera (image pickup apparatus) using the optical system according to the present embodiment as an image pickup optical system is described with reference to FIG. 11. In FIG. 11, reference numeral 10 denotes a camera body and reference numeral 11 denotes a photographing optical system, which is any one of the optical systems according to the first to fifth embodiments. Reference numeral 12 denotes a solid-state image pickup element (photoelectric conversion element), such as a CCD sensor or a CMOS sensor, that is installed in the camera body, and that receives an optical image formed by the photographing optical system 11 to perform photoelectric conversion. The camera body 10 may be a so-called single-lens reflex camera that includes a quick-turn mirror, or a so-called mirror-less camera that does not include a quick-turn mirror.

By applying the optical system according to the present embodiment to an image pickup apparatus, such as a digital still camera, in this way, it is possible to provide an image pickup apparatus whose lenses are small.

Although desirable embodiments and examples according to the present invention are described, the present invention is not limited to these embodiments and examples. Various combinations, modifications, and changes are possible within a scope of the spirit of the present invention.

According to the present invention, it is possible to provide a small optical system that can photograph at a photographing magnification greater than or equal to 1× and that has high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-226782, filed Dec. 3, 2018, which is hereby incorporated by reference herein in its entirety.

What is claimed is:

1. A substantially non-zooming optical system comprising:
a front lens group and a rear lens group that are disposed in order from an object side to an image side of the optical system, the front lens group having a positive refractive power and the rear lens group having a negative refractive power,
wherein the rear lens group consists of a lens unit Ln1 that is arranged to move towards the image side when focusing from infinity to a close distance and that has a negative refractive power, and a lens unit Ln2 that is disposed closer to the image side than the lens unit Ln1 and that has a negative refractive power,
wherein the front lens group includes a lens unit Lpf arranged to move during focusing, and
wherein the following conditional expression is satisfied:

$$-10.00 < Dn1/fn2 < -0.15$$

where Dn1 is an interval between the lens unit Ln1 and the lens unit Ln2 when focusing at infinity, and fn2 is a focal length of the lens unit Ln2.

2. The optical system according to claim 1, wherein the following conditional expression is satisfied:

$$-0.80 < Mn1/fn1 < 0.00$$

where fn1 is a focal length of the lens unit Ln1, and Mn1 is an amount of movement of the lens unit Ln1 when focusing from infinity to a closest distance.

3. The optical system according to claim 1, wherein the following conditional expression is satisfied:

$$-2.00 < Mpf/fpf < -0.40$$

where fpf is a focal length of the lens unit Lpf, and Mpf is an amount of movement of the lens unit Lpf when focusing from infinity to a closest distance.

4. The optical system according to claim 1, wherein the following conditional expression is satisfied:

$$-7.00 < (1-\beta n1^2) \times \beta n2^2 < -1.00$$

where $\beta n1$ is a lateral magnification of the lens unit Ln1 when focusing at infinity, and $\beta n2$ is a lateral magnification of the lens unit Ln2 when focusing at infinity.

5. The optical system according to claim 1, wherein the following conditional expression is satisfied:

$$-7.00 < (1-\beta pf^2) \times \beta r^2 < -2.00$$

where $\beta pf$ is a lateral magnification of the lens unit Lpf when focusing at infinity, and $\beta r$ is a combined lateral magnification of all lens units disposed on an image side of the lens unit Lpf when focusing at infinity.

6. The optical system according to claim 1, wherein the following conditional expression is satisfied:

$$0.10 < fp/f < 0.90$$

where fp is a combined focal length of the front lens group when focusing at infinity, and f is a focal length of the optical system when focusing at infinity.

7. The optical system according to claim 1, wherein the following condition expression is satisfied:

$$-1.00 < fpf/f < -0.10$$

where fpf is a focal length of the lens unit Lpf and f is a focal length of the optical system when focusing at infinity.

8. The optical system according to claim 1, wherein the following conditional expression is satisfied:

$$-30.00 < \beta pf < -2.00$$

where $\beta pf$ is a lateral magnification of the lens unit Lpf when focusing at infinity.

9. The optical system according to claim 1, wherein the following conditional expression is satisfied:

$$-3.00 < \beta pf\,mod < -0.50$$

where $\beta pf mod$ is a lateral magnification of the lens unit Lpf when focusing at a closest distance.

10. The optical system according to claim 1, wherein the following conditional expression is satisfied:

$$0.50 < -\beta\,mod < 5.00$$

where $\beta$ mod is a lateral magnification of the optical system when focusing at a closest distance.

11. The optical system according to claim 1, wherein the front lens group includes a lens unit Lp1 that is disposed closest to the object side and that has a positive refractive power, wherein the lens unit Lpf is disposed adjacent to an image side of the lens unit Lp1 and has a negative refractive power, and wherein the lens unit Lpf moves to the image side when focusing from infinity to the close distance.

12. The optical system according to claim 11, wherein the following conditional expression is satisfied:

$$0.40 < fp1/f < 1.00$$

where fp1 is a focal length of the lens unit Lp1, and f is a focal length of the optical system when focusing at infinity.

13. The optical system according to claim 11, wherein the following conditional expression is satisfied:

$$-2.50 < fp1/fpf < -1.00$$

where fp1 is a focal length of the lens unit Lp1, and fpf is a focal length of the lens unit Lpf.

14. The optical system according to claim 11, wherein the lens unit Lp1 and the lens unit Ln2 are stationary when focusing.

15. The optical system according to claim 11, wherein the front lens group includes a lens unit Lp3 that is adjacent to an image side of the lens unit Lpf and that has a positive refractive power, and wherein the lens unit Lp3 is stationary when focusing.

16. The optical system according to claim 1, wherein the lens unit Lpf and the lens unit Ln1 move in different paths when focusing.

17. An image pickup apparatus comprising:
a substantially non-zooming optical system; and
an image pickup element that photoelectrically converts an optical image that is formed by the optical system,
wherein the optical system comprises a front lens group and a rear lens group that are disposed in order from an object side to an image side of the optical system, the front lens group having a positive refractive power and the rear lens group having a negative refractive power,
wherein the rear lens group consists of a lens unit Ln1 that is arranged to move towards the image side when focusing from infinity to a close distance and that has a negative refractive power, and a lens unit Ln2 that is disposed closer to the image side than the lens unit Ln1 and that has a negative refractive power,
wherein the front lens group includes a lens unit Lpf arranged to move during focusing, and
wherein the following conditional expression is satisfied:

$$-10.00 < Dn1/fn2 < -0.15$$

where Dn1 is an interval between the lens unit Ln1 and the lens unit Ln2 when focusing at infinity, and fn2 is a focal length of the lens unit Ln2.

* * * * *